United States Patent Office 3,100,235
Patented Aug. 6, 1963

3,100,235
PRESERVATION OF RUBBER LATEX
David J. Graham and Derek H. Taysum, Kuala Lumpur, Federation of Malaya, assignors to The Natural Rubber Producers' Research Association, London, England, a British body corporate
No Drawing. Filed Sept. 26, 1960, Ser. No. 58,197
7 Claims. (Cl. 260—815)

This invention is for improvements in or relating to the preservation of Hevea latex and Hevea latex concentrates and has for an object to provide an improved process for the preservation of latices and latices of high stability and low bacterial content.

Under present conditions, preservative systems for latex are utilised in three different ways:

(a) As anticoagulants in the field to avoid premature putrefaction and clotting of latex prior to making sheet, crepe or concentrate, (b) To keep latex in the field or factory for periods normally less than 24 hours, prior to preparing latex concentrate, (c) As a long-term preservative for concentrate.

Anticoagulants are used at low concentrations where they exert only a mild bactericidal effect; their function is to delay the onset of bacterial attack, rather than prevent it. Under the second category, the objective is the prevention of bacterial proliferation, the most commonly used preservative being ammonia, at concentrations seldom exceeding 0.5 percent by weight. We have demonstrated that an alarming proportion of bacteria survive ammoniation up to 0.5 percent by weight; moreover, those bacteria which survive include those which are able to produce acidic substances and to decompose extracellular proteins, both of which are undesirable reactions in a preserved latex. On centrifuging latex, the number of bacteria present in the concentrate is considerably less, as the heavy bacterial cells are separated with the denser skim fraction. Even so, complete removal is not effected. Under the third category above, ammonia is again the most commonly used preservative, and even when employed at a level of 0.7 percent, a high level of bacterial survival may still remain. In addition, the ammoniated latex concentrate receives inocula from a variety of sources, such as factory tanks and pipelines, road or rail transport, dockside storage tanks, pipelines to ships and ships' tanks—none of which are normally maintained in a sterile condition.

Alternative preservatives to ammonia have, up to the present, suffered from other deficiencies, such as having an undesirable toxicity or being skin irritants, and leading to discolouration of the final products.

According to the present invention, there is provided a process for the preservation of Hevea latex and concentrates thereof which comprises adding thereto a thiobis-halophenol in an amount of at least 0.001% by weight of said latex or concentrate in the form of an emulsion or dispersion thereof or in the form of an alkali metal or ammonium salt thereof; the phenolic nuclei may contain more than one halogen substituent, preferably chlorine.

We have found that the thiobis-halophenols are outstanding for anticoagulation and preservative activity; the compounds are, in general, non-toxic, are capable of curing skin infections rather than causing them and are free from discolouration tendencies, being widely used in contact with delicate fabrics and textiles. In particular, 2,2'-thiobis(4,6-dichlorophenol), which we have found to be particularly effective, is widely used in medicinal preparations for use on man, is brilliant white and may be incorporated into latex at high concentration without causing any discolouration.

It is preferred to use the compounds in the form of the salts, e.g. the sodium salt of 2,2'-thiobis(4,6-dichlorophenol). This is simply formed by the addition of sodium hydroxide to a slurry of the compound in water until solution occurs. It is to be understood, however, that alternative methods of dispersion with emulsifiers or of solution involving other alkalies, for example, ammonia or potassium hydroxide, are also envisaged.

Several methods of employing the sodium salt of 2,2'-thiobis(4,6-dichlorophenol) are distinguishable in the field of latex preservation:

(a) As a spray on the tapping panel or tapping cut, or as an anticoagulant in the cup or at the field collecting station, e.g. an addition to give in the field latex a final concentration equal to, or greater than 0.001% by weight. Such a spray or additive might employ a 1% solution of the sodium salt with 0.05% of ammonium laurate, or other wetting agent.

(b) The addition to 0.1% to 0.3% ammoniated field latex of amounts of at least 0.001% by weight of the sodium salt, to prevent the development of putrefaction on storage before centrifuging. (At present, the storage of 0.3% ammoniated field latex is a weak point in the preservation process.) Here a typical example will be given. Ammoniated field latex has a viable bacterial population of the order of $10^5$; this population divides exponentially with an average generation time of about 18 hours and the latex rises rapidly in volatile fatty acid content and falls in mechanical stability, coagulating within four to fourteen days; its odour becomes increasingly foul. In our experiment, a bulk of field latex was ammoniated to 0.3% w./w. and divided in two. To one half was added 0.3% w./w. of the sodium salt of 2,2'-thiobis (4,6-dichlorophenol) while no addition was made to the second half. Within one hour, the sample containing 2,2'-thiobis(4,6-dichlorophenol) was substantially sterile (free from viable bacteria) while the other sample contained $2.9 \times 10^5$ bacteria. After 3 days the mechanical stability of the sample containing 2,2'-thiobis(4,6-dichlorophenol) had risen to 2,000 seconds while the mechanical stability of the other sample remained below 150 seconds.

(c) The addition of the sodium salt of 2,2'-thiobis (4,6-dichlorophenol) to latex concentrate containing the residual ammonia of centrifuging (0.1 to 0.2% by weight). Amounts in excess of 0.001% by weight are used. A typical example is a latex concentrate with 0.14% residual ammonia to which 0.3% by weight of the sodium salt of 2,2'-thiobis(4,6-dichlorophenol) has been added. Such concentrate has high mechanical stability, low volatile fatty acid content, low KOH No. and low viable bacterial count and contrasts strongly with the same latex concentrate to which the thiobis-chlorophenol had not been added.

(d) The addition of the sodium salt of 2,2'-thiobis (4,6-dichlorophenol) to latex concentrate containing 0.2% or 0.3% by weight of ammonia. The latter levels are ones which the processing industry finds attractive Amounts of not less than 0.001% by weight are employed. A typical preparation is one containing 0.2% ammonia with 0.3% of the disodium salt of 2,2'-thiobis(4,6-dichlorophenol); such concentrate has the desirable features described in (c) above and is illustrated in Table 1 which compares the properties of such a sample with the same latex concentrate at the same level of ammoniation and at a higher level (0.7%) after all have been stored for equal periods.

*Table 1*

| | Latex Concentrate ||||||||| 
|---|---|---|---|---|---|---|---|---|---|
| | Containing 0.2% ammonia and 0.3% of 2,2'-thiobis-(4,6-dichlorophenol) ||| Containing 0.2% ammonia ||| Containing 0.7% ammonia |||
| | After 3 days' storage | After 1 month's storage | After 6 months' storage | After 3 days' storage | After 1 month's storage | After 6 months' storage | After 3 days' storage | After 1 month's storage | After 6 months' storage |
| Dry rubber content | 59.77 | | | 61.60 | | (¹) | 60.44 | | |
| Total solids content | 61.32 | | | 63.06 | | (¹) | 61.96 | | |
| Ammonia content, percent by weight | 0.20 | 0.20 | | 0.20 | 0.20 | (¹) | 0.72 | 0.70 | |
| pH | 10.15 | 9.98 | 9.88 | 9.65 | 9.00 | (¹) | 10.60 | 10.40 | 10.35 |
| KOH number | 0.41 | 0.52 | 0.59 | 0.83 | 1.3 | (¹) | 0.45 | 0.54 | 0.61 |
| Mechanical stability | 1,010 | 2,760 | 2,660 | 54 | 9 | (¹) | 138 | 435 | 1,042 |
| V.F.A. number | 0.03 | 0.02 | 0.04 | 0.03 | 0.40 | (¹) | 0.03 | 0.03 | 0.04 |
| Bacteria per ml | <10 | <10 | <10 | $1.2 \times 10^5$ | 95 | (¹) | $2.2 \times 10^3$ | 12 | 10 |

¹ Coagulated within 3 months.

(e) The addition of the sodium salt of 2,2'-thiobis (4,6-dichlorophenol) to normal (fully 0.7% by weight) ammoniated latex concentrate to prevent individual "outbreaks" of bacterial infection—usually arising from contaminated equipment used in processing, handling and storage. Amounts in excess of 0.001% are envisaged and one example is the addition of 0.05% by weight as routine.

(f) The preservation of latex and latex concentrate, sterilised by physical methods, by the addition of the sodium salt of 2,2'-thiobis(4,6-dichlorophenol). The bacterial population of Hevea latex and latex concentrate can be reduced and, in some cases, eliminated by various physical processes: e.g. heat, ultrasonic vibration, ultraviolet irradiation and subjection to high frequency electric fields and combinations of these treatments. However, once prepared, the latices thus treated are very sensitive to bacterial attack and hence have to be handled with something approaching aseptic technique. The use of the sodium salt of 2,2'-thiobis(4,6-dichlorophenol) enables these physical process to be employed on a commercial scale.

It is believed that the use of the compounds of the general formula above set forth represents a significant step forward in latex preservation. Preservatives hitherto used have major drawbacks; either on the one hand, they are toxic or dermatitic or simply unpleasant to handle or, on the other hand, they allow spurious outbreaks of a bacterial nature which are often manifest as rises in KOH No. and volatile fatty acid content and as a fall in mechanical stability. It is believed that the compounds defined here are free from these objections and that, in particular, the sodium salt of 2,2'-thiobis(4,6-dichlorophenol) constitutes a most valuable and pleasant preservative system.

The invention also includes latices and latex concentrates containing at least 0.001% by weight of a thiobis-halophenol with or without ammonia.

We claim:
1. A process for the stabilization of Hevea latex and concentrates thereof which comprises adding thereto a phenolic preservative selected from the group consisting of 2,2'-thiobis-(4,6-dichlorophenol) and the ammonium and alkali metal salts thereof in an amount of 0.001% to 0.3% by weight thereof.

2. A process for the stabilization of Hevea latex and concentrates thereof which comprises adding thereto 2,2'-thiobis-(4,6-dichlorophenol) in an amount of from 0.001% to 0.3% by weight thereof.

3. A process for the stabilization of Hevea latex and concentrates thereof which comprises adding thereto an aqueous solution of the disodium salt of 2,2'-thiobis-(4,6-dichlorophenol), said disodium salt being in an amount of from 0.001% to 0.3% by weight of said latex.

4. A process for the stabilization of Hevea latex and concentrates thereof which comprises adding thereto an aqueous solution of the ammonium salt of 2,2'-thiobis-(4,6-dichlorophenol), said ammonium salt being in an amount of from 0.001% to 0.3% by weight of said latex.

5. A process for the stabilisation of Hevea latex and concentrates thereof which comprises adding thereto from 0.1% to 0.7% by weight of ammonia and from 0.001% to 0.3% by weight of disodium 2,2'-thiobis-(4,6-dichlorophenol).

6. A stabilized Hevea latex containing from 0.1% to 0.7% by weight of ammonia and from 0.001% to 0.3% by weight of a phenolic preservative selected from the group consisting of 2,2'-thiobis-(4,6-dichlorophenol) and the ammonium and alkali metal salts thereof.

7. A stabilised Hevea latex containing from 0.001% to 0.3% by weight of 2,2'-thiobis-(4,6-dichlorophenol) and from 0.1% to 0.7% by weight of ammonia.

References Cited in the file of this patent
UNITED STATES PATENTS

| | | |
|---|---|---|
| 2,254,267 | Carswell | Sept. 2, 1941 |
| 2,581,930 | Albert | Jan. 8, 1952 |
| 2,726,277 | Downey | Dec. 6, 1955 |
| 2,822,413 | Albert | Feb. 4, 1958 |